(12) United States Patent
Funck et al.

(10) Patent No.: US 12,472,701 B2
(45) Date of Patent: Nov. 18, 2025

(54) REINFORCED STRUCTURE HAVING CONTINUOUS FIBER REINFORCED ELEMENTS AND METHOD OF MAKING THEREOF

(71) Applicant: Albany Engineered Composites, Inc., Rochester, NH (US)

(72) Inventors: Ralph Funck, Kaiserslautern (DE); Jens Jung, Kaiserslautern (DE); Martin Welsch, Henschtal (DE)

(73) Assignee: Albany Engineered Composites, Inc., Rochester, NH (US)

( * ) Notice: Subject to any disclaimer, the term of this patent is extended or adjusted under 35 U.S.C. 154(b) by 0 days.

(21) Appl. No.: 18/369,407

(22) Filed: Sep. 18, 2023

(65) Prior Publication Data

US 2024/0001626 A1 Jan. 4, 2024

Related U.S. Application Data

(63) Continuation of application No. 17/328,351, filed on May 24, 2021, now Pat. No. 11,813,806.
(Continued)

(51) Int. Cl.
*B29C 70/16* (2006.01)
*B29C 70/30* (2006.01)
(Continued)

(52) U.S. Cl.
CPC .............. *B29C 70/16* (2013.01); *B29C 70/30* (2013.01); *B29K 2101/12* (2013.01); *B29K 2105/08* (2013.01)

(58) Field of Classification Search
CPC ..... B29C 70/0035; B29C 70/16; B29C 70/20; B29C 70/205; B29C 70/32; B29C 70/52; B29C 70/682; B29C 70/85; B29C 70/86; B29C 66/54; B29C 66/22; B29C 66/1182; B29C 53/66; B29C 53/581; B29C 53/582; B29C 48/21; B29C 48/18; B29C 48/09; B29C 48/19; B29C 48/2886; B32B 2597/00; B32B 2307/732; B32B 2250/03; B32B 27/12; B32B 5/12; B32B 5/024; B32B 1/08; B32B 3/06; B29L 2023/00;
(Continued)

(56) References Cited

U.S. PATENT DOCUMENTS

| 10,208,177 B2 | 2/2019 | Hannen |
| 10,400,074 B2 | 9/2019 | Singh et al. |

(Continued)

FOREIGN PATENT DOCUMENTS

| CN | 105109125 A | 12/2015 |
| FR | 2 098 594 A5 | 3/1972 |

(Continued)

OTHER PUBLICATIONS

International Search Report and Written Opinion prepared for corresponding international application PCT/US2021/033858 by the European Patent Office, acting as the International Searching Authority, and mailed Sep. 8, 2021.

*Primary Examiner* — Camie S Thompson
(74) *Attorney, Agent, or Firm* — McCarter & English, LLP

(57) ABSTRACT

Disclosed are reinforced structures. The structures are comprised of reinforced elements that have continuous fibers embedded in a matrix material. The reinforced elements are combined in a matrix material to form a desired shape of reinforced structure.

10 Claims, 7 Drawing Sheets

Related U.S. Application Data

(60) Provisional application No. 63/032,263, filed on May 29, 2020.

(51) Int. Cl.
*B29K 101/12* (2006.01)
*B29K 105/08* (2006.01)

(58) Field of Classification Search
CPC ............ B29L 2022/00; B29D 99/0003; B29D 23/001
USPC ......... 428/297, 297.1, 297.4, 334, 333, 332, 428/337, 331, 36, 36.1
See application file for complete search history.

(56) References Cited

U.S. PATENT DOCUMENTS

| | | |
|---|---|---|
| 2005/0100700 A1 | 5/2005 | Frabbi |
| 2007/0193676 A1 | 8/2007 | Portoles |
| 2016/0069484 A1 | 3/2016 | Jha et al. |

FOREIGN PATENT DOCUMENTS

| | | |
|---|---|---|
| JP | H 02-092623 A | 4/1990 |
| JP | H 05-84847 A | 4/1993 |
| JP | H 05-138758 A | 6/1993 |
| JP | H 08-091913 A | 4/1996 |
| JP | H 10-71220 A | 3/1998 |
| JP | 2000-153567 A | 6/2000 |
| RU | 2560375 C2 | 8/2015 |
| RU | 175376 U1 | 12/2017 |
| WO | WO 2006/019478 A1 | 2/2006 |

REINFORCED STRUCTURE HAVING CONTINUOUS FIBER REINFORCED ELEMENTS AND METHOD OF MAKING THEREOF

CROSS-REFERENCE TO RELATED APPLICATIONS

This application is a continuation of U.S. patent application Ser. No. 17/328,351 filed on May 24, 2021, which claims the benefit of priority of U.S. Provisional Patent Application Ser. No. 63/032,263 filed May 29, 2020. The foregoing applications are incorporated herein by reference in their entireties.

BACKGROUND

1. Field

The invention relates to a thermoplastic structure having a profile that is reinforced with continuous fiber reinforcing filaments.

2. Related Art

The use of highly resilient fiber composite materials, e.g., with carbon, glass, aramid, ceramic or basalt fibers as well as a matrix, e.g., made of thermosetting or thermoplastic, elastomer, carbon, graphite or ceramic, and related materials requires the use of appropriate constructions for the transmission of power appropriate to the material. Material-related means that the anisotropy of the material with regard to the different mechanical properties in the fiber direction and across it is used in a targeted manner.

Connecting rods made of fiber composite material for power transmission are used in particular for guidance and mechanical storage, for support, for bracing, or for connection. Connecting rods made of fiber composite material have been known for many years. Such connecting rods are preferably, but not exclusively, used in aircraft or spacecraft. Connecting rods of aircraft and spacecraft, for example airplanes, rotary-wing aircraft, airships, unmanned aviation systems, rockets or satellites are mainly axially loaded by both compressive and tensile forces.

The increasing demands for weight and cost savings lead to limits of the potential of known designs for struts with tubular bodies made of thermosetting fiber composite materials.

The thermoplastic structure can be employed for connecting rods or tension and compression struts, in which a strut with large external dimensions may be achieved within a predetermined installation space.

When using fiber-reinforced pipes and profiles on a thermosetting matrix basis, there is often a fundamental problem of keeping laminate damage caused by an impact as low as possible. Costly tough modified resin systems are often used for problematic impact damage. In contrast, using a thermoplastic matrix material has a positive impact on impact behavior.

Production costs for fiber-reinforced profiles are very high and the profile geometry is nevertheless very limited. Profiles that are made with a thermosetting matrix cannot be reshaped after they have been completed and thermosets have a poorer impact behavior compared to thermoplastics. Furthermore, there is only a limited number of thermosets that have an FST (fire smoke and toxicity) approval and can be used in certain environments including the aviation sector.

SUMMARY OF THE DISCLOSURE

The present technique can provide a thermoplastic structure having a profile which is reinforced with continuous fiber reinforcing filaments. This profile can form the basis for tension and compression struts and other supporting structures.

An embodiment of the disclosure includes a reinforced structure having a cross-sectional profile having continuous fiber-reinforcing filaments and a first matrix material. The continuous fiber-reinforcing filaments are embedded along a longitudinal axis of a fiber-reinforced element in the first matrix material to form continuous fiber-reinforced elements.

In some embodiments, the reinforced structure further comprises a second matrix material. The continuous fiber-reinforced elements are embedded in the second matrix material to form the cross-sectional profile.

In one variation, the first matrix material and the second matrix material are different materials. In another variation, the first matrix material and the second matrix material are the same material.

In one aspect, the cross-sectional profile of the reinforced structure can have a shape selected from the group consisting of triangular, circular, rectangular, and T-shaped. In an implementation, the cross-sectional profile has an outer contour surrounding a hollow area of a shape selected from the group consisting of triangular, circular, and rectangular.

In another aspect, the cross-sectional profile of the continuous fiber-reinforced elements can be a shape selected from the group consisting of triangular, circular, rectangular, trapezoidal, and hexagonal. In a particular aspect, the continuous fiber-reinforced elements have a circular cross-sectional shape with a diameter of 0.4 mm or greater.

In yet another aspect, the reinforced structure includes continuous fiber-reinforced elements having an outer contour for interlocking or intermeshing with other continuous fiber-reinforced elements.

The reinforced structure can have a fiber volume fraction of the continuous fiber-reinforced element of at least 35%.

In a particular embodiment, the reinforced structure has a tubular cross-sectional profile. The continuous fiber-reinforced elements may have a cross-sectional shape selected from the group consisting of triangular, circular, rectangular, trapezoidal, and hexagonal. In one implementation, the continuous fiber-reinforced elements have a circular cross-sectional shape with a diameter of 0.4 mm or greater. In any of the tubular reinforced structures, the fiber volume fraction of the continuous fiber-reinforced element may be at least 35%.

In one aspect of the reinforced structure having a tubular cross-sectional profile, the fiber-reinforced elements may have a cross-sectional shape that is an arc segment of a diameter (D) of the tubular cross-section. The fiber reinforced elements form a tubular arrangement of the reinforced structure. A winding layer of unidirectional reinforced tape may be wound around and on an outer surface of the tubular arrangement of arc segments.

In another aspect of the reinforced structure having a tubular cross-sectional profile, the fiber-reinforced elements may have a cross-sectional shape that is an arc segment of a diameter (D) of the tubular cross-section. The arc segments form the tubular arrangement of the reinforced structure having gaps between edges of the fiber-reinforced elements. A matrix material can surround an outer surface of the tubular arrangement and fill the gaps. A winding layer of unidirectional reinforced thermoplastic tape may be wound around and on an outer surface of the matrix material.

An embodiment of the disclosure is a method of forming the reinforced structure with the tubular cross-sectional profile that includes forming at least two of the arc segments of a diameter (D) of the tubular cross-section and forming a tubular arrangement of the reinforced structure with the at least two arc segments. This can include winding a layer around and on an outer surface of the formed tubular arrangement.

In one aspect of the method of forming the reinforced structure, edges of adjacent arc segments are in contact and adhered to one another at contact locations. In a particular implementation, the arc segments are interlocking elements to adhere to one another.

In another aspect of the method of forming the reinforced structure, there is a gap between edges of adjacent arc segments forming the tubular arrangement and applying a matrix material on an outside surface of the arc segments, the matrix material filling the gaps.

In any aspect of the method of forming the reinforced structure having a tubular arrangement, the layer wound on the outside surface may be unidirectional reinforced thermoplastic tape. Alternatively, the layer is unidirectional reinforced thermosetting tape. In either of these aspects, the method includes winding the layer under a pretension with a defined winding feed width and rotation and heating the layer to melt a matrix of the tape and the tubular arrangement to aid in bonding.

DETAILED DESCRIPTION

Terms "comprising" and "comprises" in this disclosure can mean "including", "includes" or "having" or can have the meaning commonly given to the term "comprising" or "comprises" in U.S. Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

The terms "threads", "fibers", "filaments", and "yarns" are used interchangeably in the following description. "Threads", "fibers", "filaments", and "yarns" as used herein can refer to monofilaments, multifilament yarns, twisted yarns, multifilament tows, textured yarns, braided yarns, coated yarns, bicomponent yarns, as well as yarns made of any material known to those ordinarily skilled in the art. Yarns can be made of carbon, fiberglass, cotton, aramid, polyamide, polyester, metal, polyethylene, and/or other materials that exhibit desired physical, thermal, chemical or other properties.

The terms "embedded" and "encapsulated" are used interchangeably.

Fiber-reinforced structures according to the disclosure may be characterized in that the profile cross-section is filled with the continuous fiber-reinforced elements in order to enhance mechanical properties such as strength and rigidity. In a particular application, such fiber-reinforced structures can provide a cross-sectional profile for support members such as connecting rods or tension and compression struts, in which a strut with the largest possible external dimensions may be achieved within a predetermined installation space.

Figure 1:
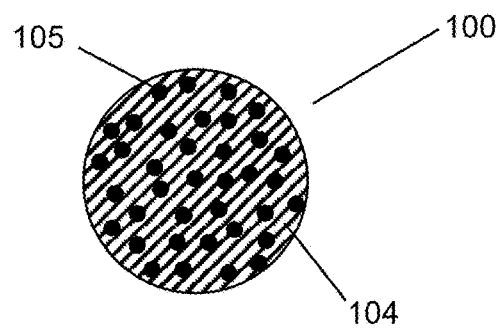
FIG. 1 illustrates a cross-sectional profile of a fiber-reinforced element having a circular cross-section.

FIG. 1 illustrates a cross-sectional profile of a fiber-reinforced element 100. A circular cross-sectional shape is illustrated but other cross-sectional shapes are contemplated including, but not limited to rectangular, triangular, trapezoidal, hexagonal, etc. The continuous fiber-reinforced elements can have a fiber volume content of at least 35%. The fiber-reinforced element includes continuous fiber-reinforcing filaments 105 embedded in matrix 104, are continuous over the length of the fiber-reinforcing element 100, and distributed over the cross-sectional profile. The continuous fiber-reinforced elements 100 can have a diameter of at least mm.

Fiber-reinforcing filaments are comprised of materials that include, but are not limited to, textiles, carbon, glass, basalt, plastic, ceramic, aramid, polyester, nylon, and rayon. Matrix material includes, but is not limited to, Polypropylene (PP), Polyamide (PA), Acrylonitrile butadiene styrene (ABS), Polyethylene Imine (PEI), Polyphthalamide (PPA), Polyphenylene sulfide (PPS), Polyaryletherketone (PAEK), Polyetherketoneketone PEKK), or Polyetheretherketone (PEEK). Textiles include single fiber filaments or rovings made of glass, carbon, basalt, ceramic and/or plastic to form woven fabrics, braids, knitted fabrics, and laid fabrics.

A thermoplastic, continuous fiber-reinforced element can be produced, for example, by a pultrusion process to which the continuous fiber-reinforcing filaments are fed.

Figure 2:
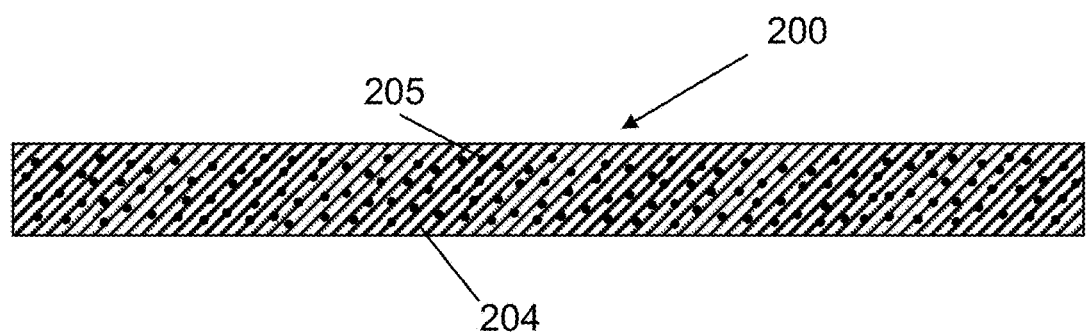
FIG. 2 illustrates a cross-sectional profile of a fiber-reinforced element having a rectangular cross-section.

FIG. 2 illustrates a fiber-reinforced element 200 continuously fiber-reinforced full profile with a rectangular cross-section and having fiber-reinforcing filaments 205 embedded in matrix material 204. The dimensions of the fiber-reinforced element may be equal to or greater than 0.5 inches (12.7 mm) wide by 0.008 inches (0.2 mm) thick.

Figure 3:
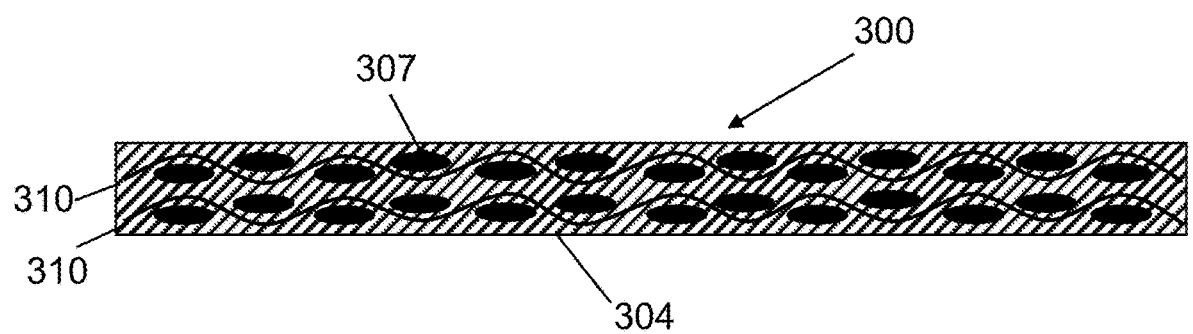
FIG. 3 illustrates a cross-section of a woven fiber-reinforced element.

FIG. 3 illustrates a cross-section of a woven fiber-reinforced element 300, which comprises matrix material 304 and textile reinforcing filaments 307 interwoven with fibers 310. By using semi-finished textile products, additional reinforcements can be achieved transversely to the longitudinal axis of the element 300 with fibers 310. Element 300 is illustrated having a rectangular cross-sectional shape for convenience as any shape is contemplated. Textile reinforcing filaments 307 are illustrated having an oval-shaped cross-section but other shapes are contemplated. Moreover, the shape of textile reinforcing filaments 307 may be altered when subjected to compressive forces.

Woven fiber-reinforced elements 300 can be combined to form reinforced structures having any desired cross-sectional profile as described herein.

Figure 4A:
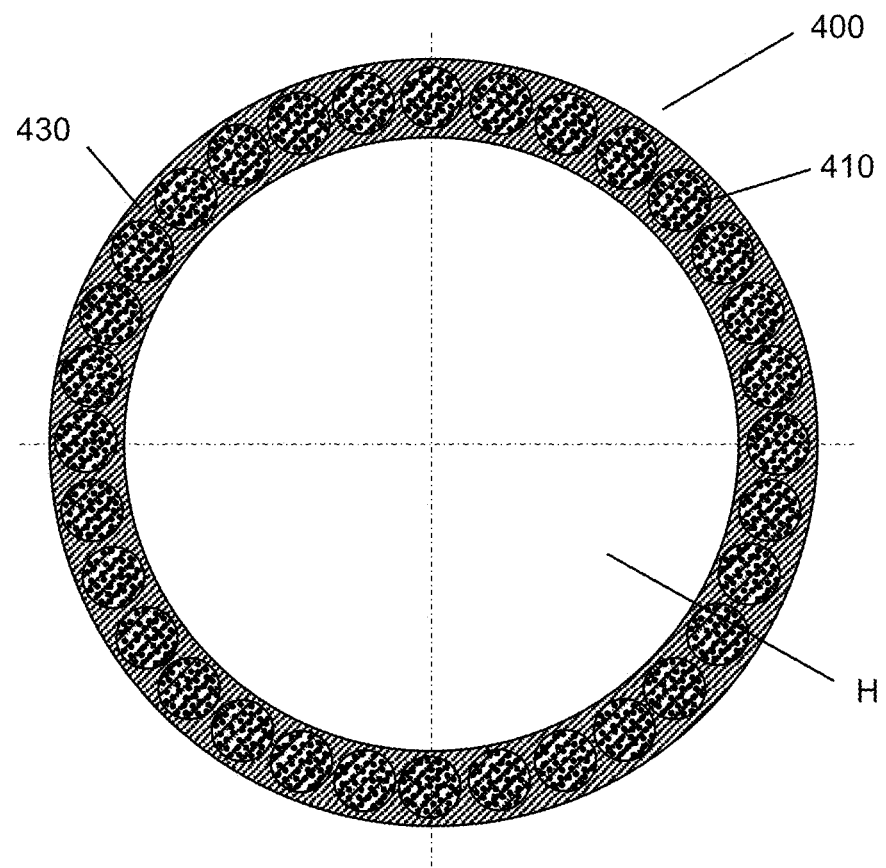
FIGS. 4A-4D illustrate examples of cross-sectional shapes of structural elements comprised of fiber-reinforced elements.
Figure 4B:
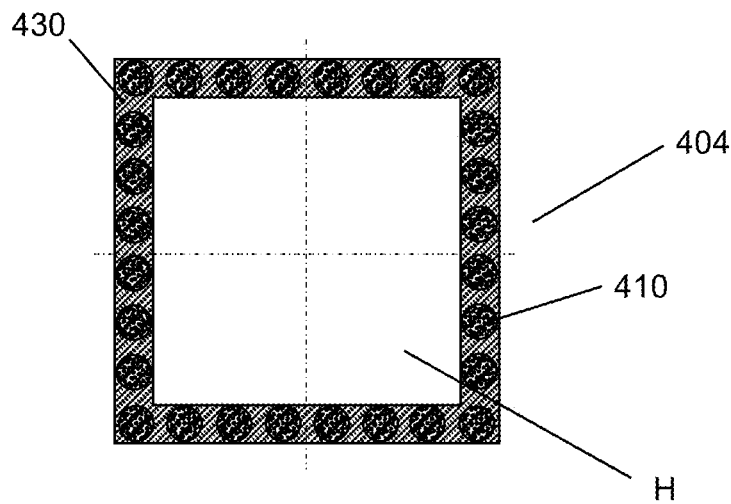
Figure 4C:
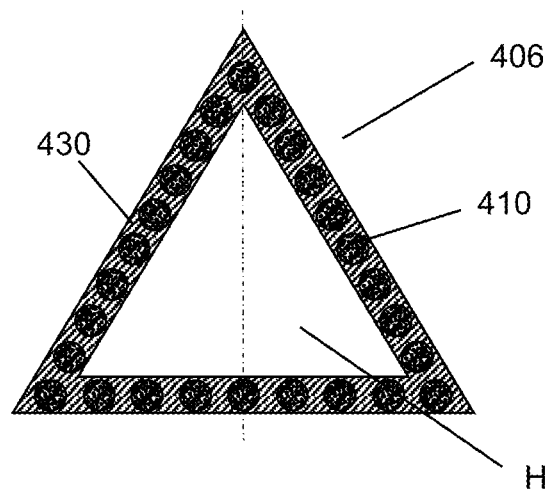

FIGS. 4A-4D illustrate non-limiting examples of cross-sectional shapes of structural elements that may be comprised of fiber-reinforced elements described herein above. Circular fiber-reinforced elements are shown for convenience although other shapes are contemplated. The cross-sectional shapes of FIGS. 4A-4C are outer contours that are perimeters of the shapes. That is, the perimeters of the structural elements surround a hollow area H.

Figure 4D:
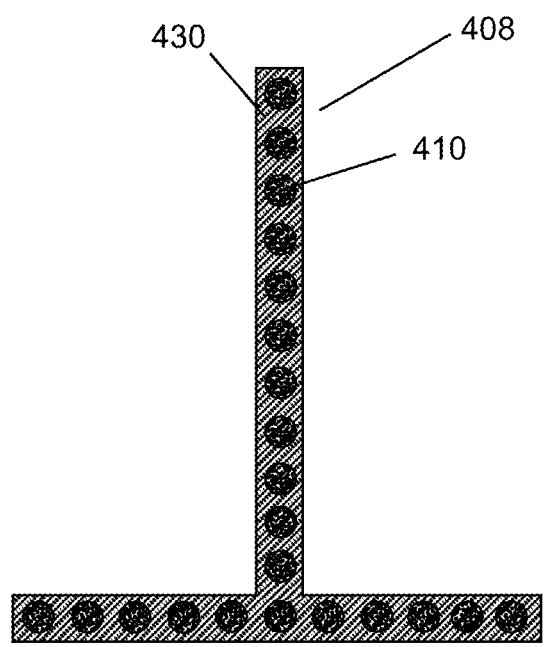

FIG. 4A illustrates a circular structural element 400 comprised of fiber-reinforced elements 410 embedded in a matrix material 430. Matrix material 430, discussed above, may be the same or different from the matrix material in fiber-reinforced element 410. FIG. 4B illustrates a rectangular structural element 404 comprised of fiber-reinforced elements 410 embedded in matrix material 430. FIG. 4C illustrates a triangular structural element 406 comprised of fiber-reinforced elements 410 embedded in matrix material 430. FIG. 4D illustrates a T-shaped structural element 408 comprised of fiber-reinforced elements 410 embedded matrix material 430. FIGS. 4A-D illustrate examples of structural element shapes that may be formed from fiber-reinforced elements. Other structural element shapes are contemplated.

Figure 5:
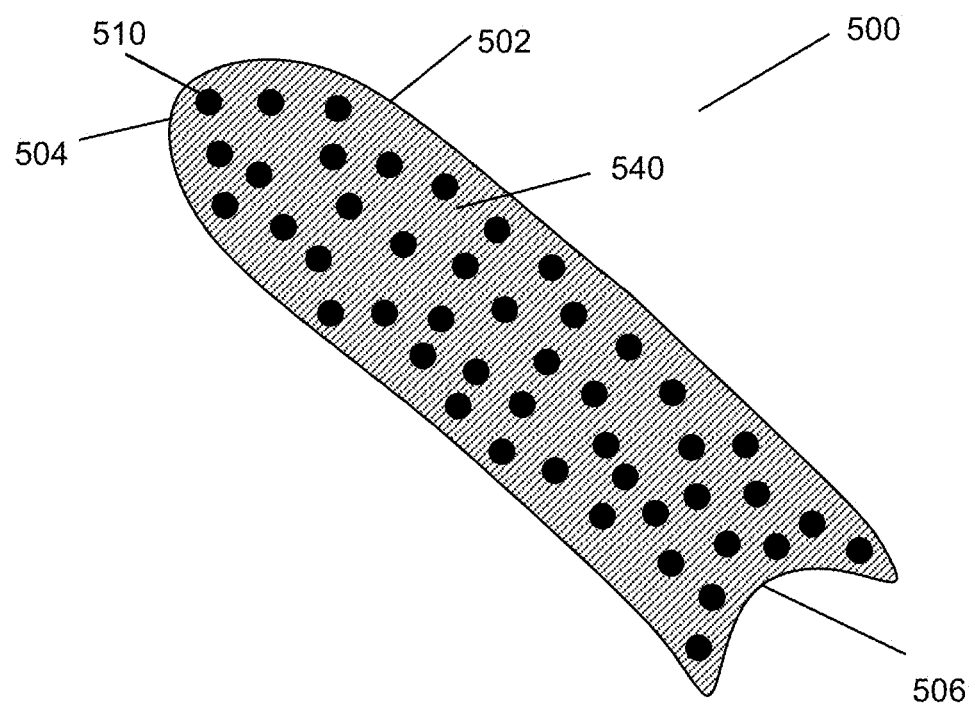
FIG. 5 illustrates a cross-sectional profile of a continuous fiber-reinforced interlocking element.

FIG. 5 illustrates a section of a continuous fiber-reinforced interlocking element 500 in connection with continuous fiber-reinforcing filaments 510. The fiber-reinforcing filaments may be similar to those described above with respect to FIG. 1. Fiber-reinforcing filaments can lie unidirectionally along the length of element 500 and be embedded in a matrix material 540.

Figure 6:
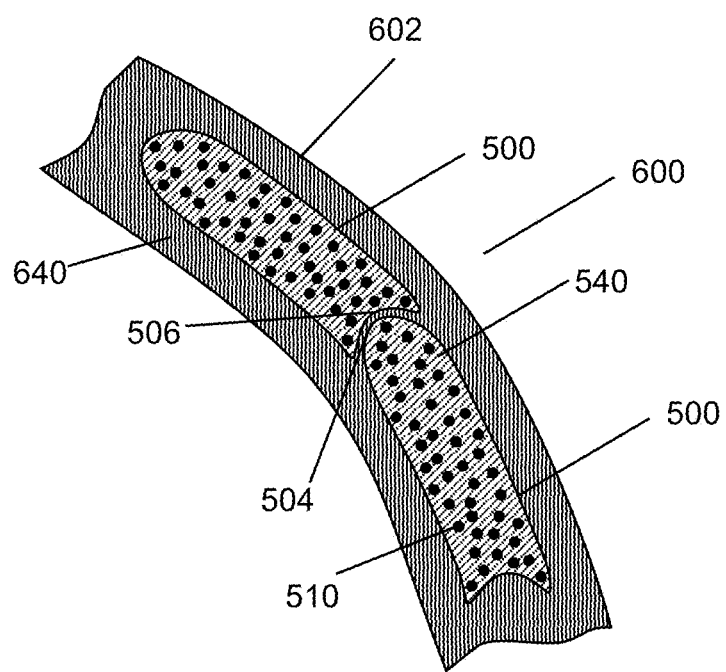
FIG. 6 illustrates a detail of a cross-sectional shape of a structural tubular element including at least two interlocking fiber-reinforced elements of FIG. 5.

The continuous fiber-reinforcing elements 500 can interlock or intermesh as a result of functional outer contour 502. Interlocking element 500 illustrates one possible interlocking functional outer contour 502 having a head portion 504 and a tail portion 506. Head portion 504 is shaped to interlock or nest in tail portion 506 as illustrated in FIG. 6. Other functional outer contours that interlock that are known to those of ordinary skill in the art are contemplated without departing from the inventive concept of the presently disclosed technique.

FIG. 6 illustrates one implementation of a reinforced structure 600 including at least two interlocking fiber-reinforced elements 500. Fiber-reinforced structure 600 can have any desired external shape, which may be formed by the interlocking of at least two fiber-reinforced elements 500 in matrix material 640, which may be the same or different from the matrix material 540 of the fiber-reinforced interlocking elements, to form a desired external shape 602.

Figure 7:
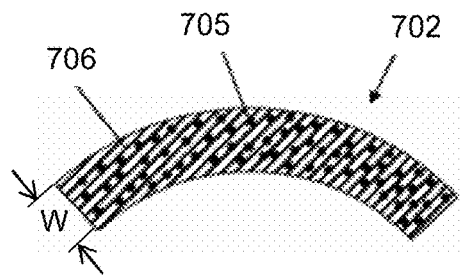
FIG. 7 illustrates a cross-section of a fiber-reinforced element having an arc segment profile.

FIG. 7 illustrates a cross-section of another implementation of a fiber-reinforced element 702 comprised of fiber-reinforcing filaments 705 embedded in matrix material 706. Fiber-reinforced elements 702 can be an arc segment of a circle. A thickness W of element 702 can be 1 mm but any desired thickness may be formed.

Figure 8:
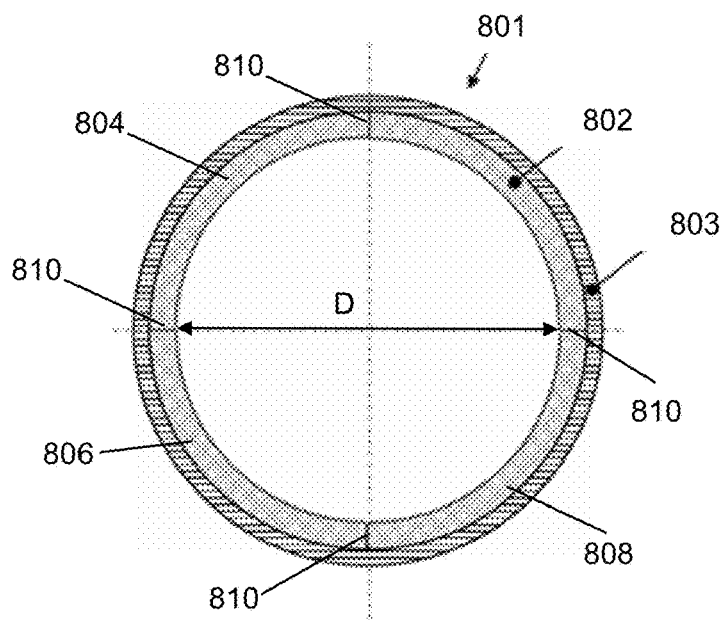
FIG. 8 illustrates a cross-sectional profile of a first reinforced tubular structure using the elements of FIG. 7 in combination with a layer of reinforcement.

FIG. 8 illustrates a cross-section of a reinforced tubular structure 801 formed from fiber-reinforced elements 802, 804, 806, 808. Each of fiber-reinforced elements 802, 804, 806, 808 may be an arc segment of a circle formed as discussed above with respect to FIG. 7. The elements 802, 804, 806, 808 form a circle having a diameter D that can be surrounded and contacted on the outside of elements 802, 804, 806, 808 by a winding layer 803. As illustrated, each fiber-reinforced element 802, 804, 806, 808 is a quarter (90 degree) arc segment. The illustration of FIG. 8 is for convenience of explanation as there may two or more fiber-reinforced elements. Moreover, those elements may be any number arc degrees and are not necessarily an equal number of arc degrees.

Elements 802, 804, 806, 808 may be assembled at contact locations 810 to form a tubular structure. Elements 802, 804, 806, 808 may be adhered to one another at contact locations 810 by any known mechanism known to those of ordinary skill in the art. Alternatively, the arc segments may be pre-fixed on a mandrel with adherence points for adhesive or the like, on an inner surface of the arc segments. Moreover, elements 802, 804, 806, 808 may be adhered to one another by being interlocking elements as discussed above with respect to FIG. 5. A winding layer 803 can be formed using unidirectional reinforced thermoplastic tape wound around the formed tubular structure as will be described later.

Figure 9:
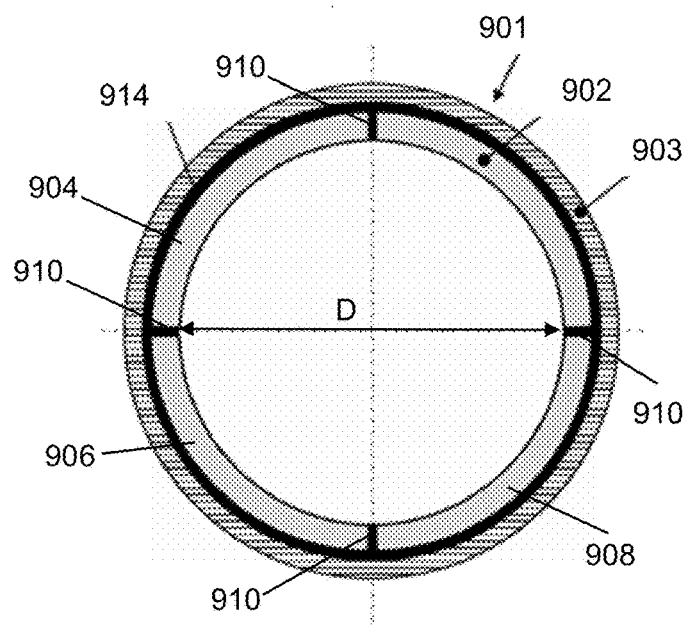
FIG. 9 illustrates a cross-sectional profile of a second reinforced tubular structure using the elements of FIG. 7 in combination with a layer of reinforcement.

FIG. 9 illustrates a cross-section of a reinforced tubular structure 901 formed from fiber-reinforced elements 902, 904, 906, 908. Each of fiber-reinforced elements 902, 904, 906, 908 may be an arc segment of a circle formed as discussed above with respect to FIG. 7. The elements 902, 904, 906, 908 form a circle with gaps 910 between the arc segments. A matrix material 914 can fill gaps 910, and also surround and contact the elements on their outside, which may be accomplished by a co-extrusion process or other known means. A winding layer 903 can surround and contact the outside of matrix material 914. Winding layer 903 can be formed using unidirectional reinforced thermoplastic or thermoset tape wound around the formed tubular structure as will be described later. The illustration of FIG. 9 is for convenience of explanation as there may be two or more fiber-reinforced elements. Moreover, those elements may be any number arc degrees and are not necessarily an equal number of arc degrees.

Figure 10A:
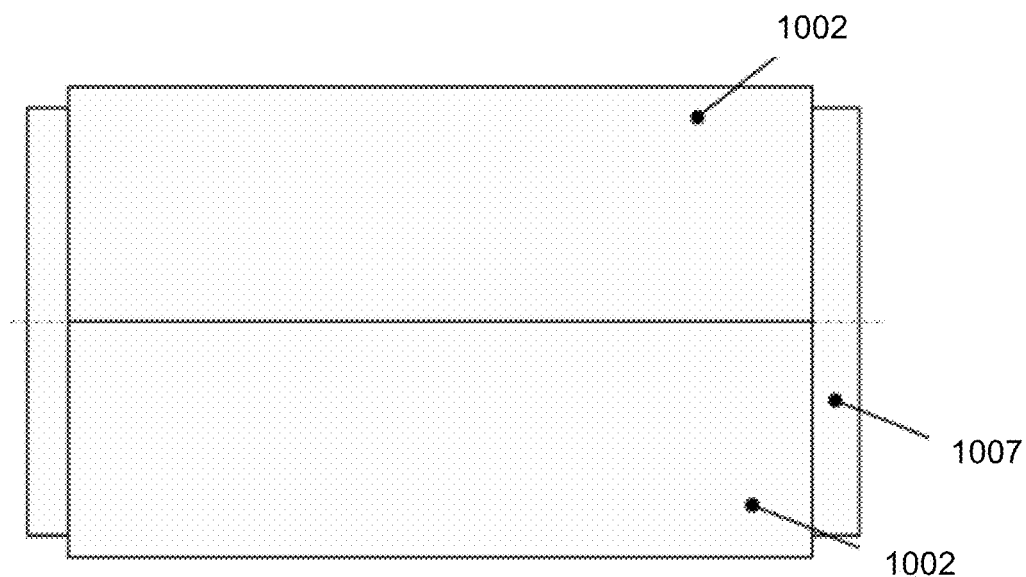
FIGS. 10A-10B illustrate a mechanism for applying a hoop layer to fix several fiber-reinforced elements having an arc segment profile to achieve a reinforced tubular structure.

FIG. 10A illustrates a first process step in which arc segment elements 1002, which could be arc segment elements 802, 804, 806, 808 are positioned on a mandrel 1007.

Figure 10B:
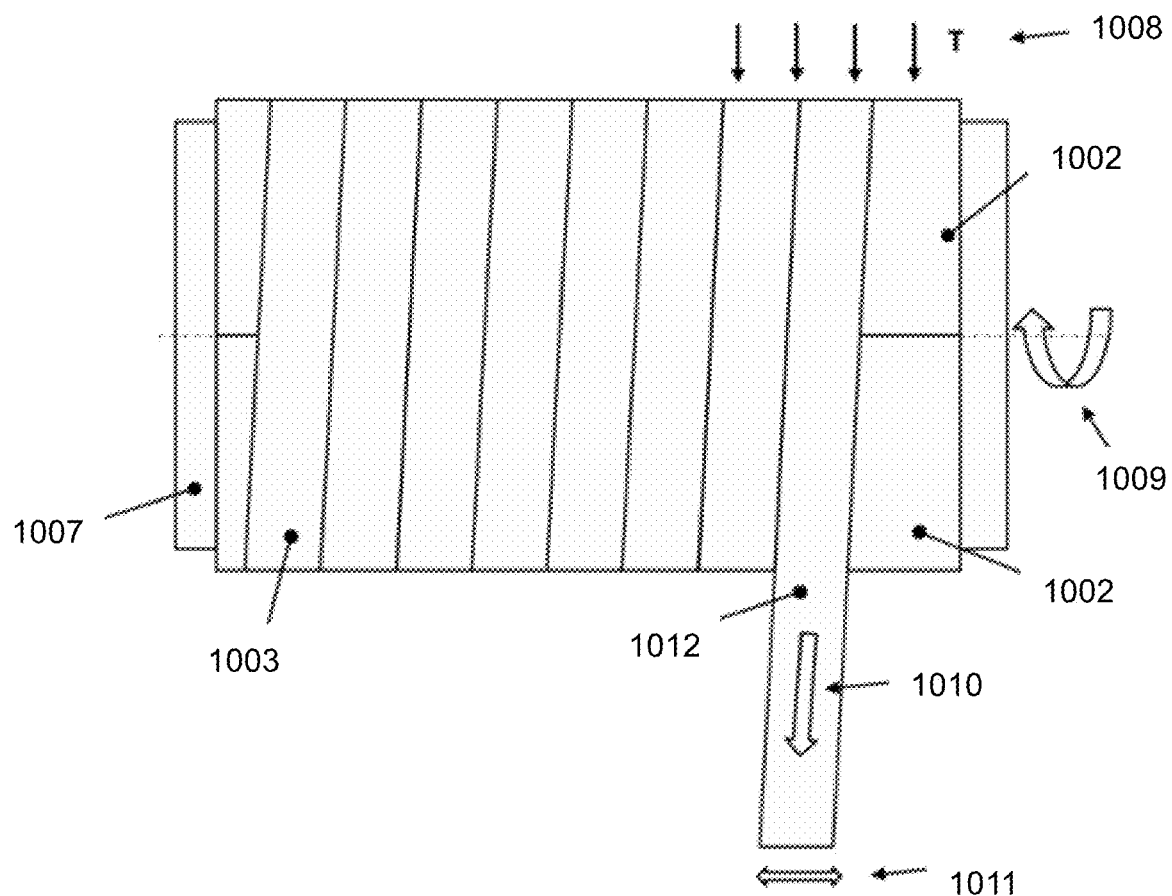

FIG. 10B illustrates a second process step in which arc segment elements 1002 positioned on mandrel 1007 are reinforced by a winding layer 1003 made of unidirectional reinforced thermoplastic tape 1012. Winding layer 1003 is shown as a hoop winding produced for example by thermoplastic winding wherein a heat source 1008 that melts the matrix of the tape 1012 and is wound under pretension 1010 and with a defined winding feed width 1011 and rotation 1009. By the hoop winding, the arc segment elements are fixed and consolidated in the tube body. The winding layer may also be cross-wound layers. With cross-wound layers the winding layers deviate from a hoop winding angle of about 90° to the longitudinal axis of the arc segments. For example, the cross-wound layer of tape may be wound at ±45° to the longitudinal axis of the arc segments. Other winding angles are also contemplated. The winding layer may be one or more than one layer.

The winding process can be discontinuous or continuous. In case of continuous winding, the arc segment elements could be pre-fixed by co-extrusion. Alternatively, the arc segment of the tubular structure can be pultruded directly without an intermediate step of fabricating fiber-reinforced elements. Furthermore, in contrast to discontinuous winding, the winder and not the component would rotate. In the case of continuous winding, pre-fixing may be sufficient to eliminate a mandrel.

Other implementations are within the scope of the following claims.

The invention claimed is:

1. A reinforced structure having a tubular cross-sectional profile comprising:
   continuous fiber-reinforcing filaments; and
   a first matrix material,
   wherein the continuous fiber-reinforcing filaments are embedded along a longitudinal axis of a fiber-reinforced element in the first matrix material to form continuous fiber-reinforced elements,
   wherein the fiber-reinforced elements have a cross-sectional shape that is an arc segment of a diameter (D) of a tubular cross-section,
   wherein fiber-reinforced elements form a tubular arrangement of the reinforced structure, and
   wherein a winding layer of unidirectional reinforced tape is wound around and on an outer surface of the tubular arrangement.

2. The reinforced structure according to claim 1, comprising:
   a second matrix material,
   wherein the continuous fiber-reinforced elements are embedded in the second matrix material to form the cross-sectional profile.

3. The reinforced structure according to claim 2, wherein the first matrix material and the second matrix material are different materials.

4. The reinforced structure according to claim 2, wherein the first matrix material and the second matrix material are the same material.

5. The reinforced structure according to claim 1, wherein the continuous fiber-reinforced elements have an outer contour for interlocking or intermeshing with other continuous fiber-reinforced elements.

6. The reinforced structure according to claim 5, wherein the continuous fiber-reinforced elements are interlocked with one another and embedded in a second matrix material.

7. The reinforced structure according to claim 1, wherein the tubular arrangement of continuous fiber-reinforced elements has a cross-sectional shape selected from the group consisting of triangular, circular, rectangular, trapezoidal, and hexagonal.

8. The reinforced structure according to claim 7, wherein the tubular arrangement of continuous fiber-reinforced elements has a circular cross-sectional shape with a diameter of 0.4 mm or greater.

9. The reinforced structure according to claim 1, wherein a fiber volume fraction of the continuous fiber-reinforced element is at least 35%.

10. The reinforced structure according to claim 1, comprising:
    fiber-reinforced elements forming a tubular arrangement of the reinforced structure having gaps between edges of the fiber-reinforced elements;
    a second matrix material surrounding an outer surface of the tubular arrangement and filling the gaps; and
    a winding layer of unidirectional reinforced thermoplastic tape wound around and on an outer surface of the second matrix material.

* * * * *